(12) United States Patent
Senatori

(10) Patent No.: US 8,300,394 B2
(45) Date of Patent: Oct. 30, 2012

(54) TRACK GUIDED HINGE FOR A PORTABLE ELECTRONIC DEVICE

(75) Inventor: Mark Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 12/815,568

(22) Filed: Jun. 15, 2010

(65) Prior Publication Data

US 2011/0304983 A1 Dec. 15, 2011

(51) Int. Cl.
*G06F 1/16* (2006.01)
*H05K 5/00* (2006.01)
*H05K 7/00* (2006.01)
*E05D 11/06* (2006.01)

(52) U.S. Cl. .......... 361/679.27; 455/575.3; 16/358

(58) Field of Classification Search .. 361/679.26–679.3; 455/575.1, 575.3; 16/233, 282, 302, 357–361
See application file for complete search history.

(56) References Cited

U.S. PATENT DOCUMENTS

| | | | |
|---|---|---|---|
| 4,584,589 A * | 4/1986 | Bivins et al. | 343/882 |
| 5,168,426 A | 12/1992 | Hoving et al. | |
| 5,815,886 A | 10/1998 | Nishio et al. | |
| 6,191,937 B1 * | 2/2001 | Bang | 361/679.23 |
| 6,612,668 B2 * | 9/2003 | Doan | 312/223.2 |
| 7,107,084 B2 | 9/2006 | Duarte et al. | |
| 7,187,537 B2 * | 3/2007 | Liao | 361/679.09 |
| 7,630,195 B2 * | 12/2009 | Lin | 361/679.26 |
| 2004/0201954 A1 * | 10/2004 | Weng et al. | 361/681 |
| 2006/0244700 A1 * | 11/2006 | Sano et al. | 345/87 |
| 2008/0016651 A1 | 1/2008 | Marsh et al. | |
| 2008/0101003 A1 * | 5/2008 | Lin | 361/683 |
| 2008/0242380 A1 * | 10/2008 | Kajihara et al. | 455/575.4 |
| 2008/0304215 A1 * | 12/2008 | Chiu | 361/681 |
| 2010/0190530 A1 * | 7/2010 | Wada et al. | 455/566 |

* cited by examiner

*Primary Examiner* — Adrian S Wilson
(74) *Attorney, Agent, or Firm* — Romiwa C. Akpala

(57) ABSTRACT

Embodiments of the present invention disclose a track guided hinge assembly for a portable electronic device. According to one embodiment, the portable electronic device includes a base housing and a panel configured to cover a top surface of the base housing. A first mounting bracket having a first guide track is mounted within the base housing. A second mounting bracket having a second guide track is positioned adjacent to the first mounting bracket. Furthermore, the portable electronic device includes a panel bracket member including a hinge pivot shaft that extends perpendicularly therefrom and configured to follow the second guide track, and a guide plate having a guide pin extending perpendicularly therefrom and configured to follow the first guide track. When the panel pivots and rotates away from the base housing, the guide pin moves along the first guide track simultaneously as the pivot shaft moves along the second guide track.

17 Claims, 5 Drawing Sheets

TRACK GUIDED HINGE FOR A PORTABLE ELECTRONIC DEVICE

BACKGROUND

The emergence and popularity of mobile computing has made portable electronic devices, due to their compact design and light weight, a staple in today's marketplace. Many portable electronic devices employ a clam-shell type design such as notebook computers, netbooks, tablet personal computers, and handheld devices. Generally, a clam-shell design consists of two housings connected together at a common end—an upper housing commonly utilized for providing display to a user and a lower housing utilized for housing the circuitry that operates the portable electronic device such as the keyboard, touch pad, power supply, etc. However, as such clam-shell devices are further reduced in size and movable parts, flush alignment and efficient movement of the two housings from a closed to open position and vice versa, becomes increasingly problematic.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a three-dimensional exploded view of the track guided hinge assembly, while

FIG. 3A is an exemplary view of a portable electronic device and panel housing in a closed position, while

FIG. 5A is a three-dimensional perspective view of a track guided hinge assembly utilizing a pair of link arms, while

NOTATION AND NOMENCLATURE

Figure 1A:
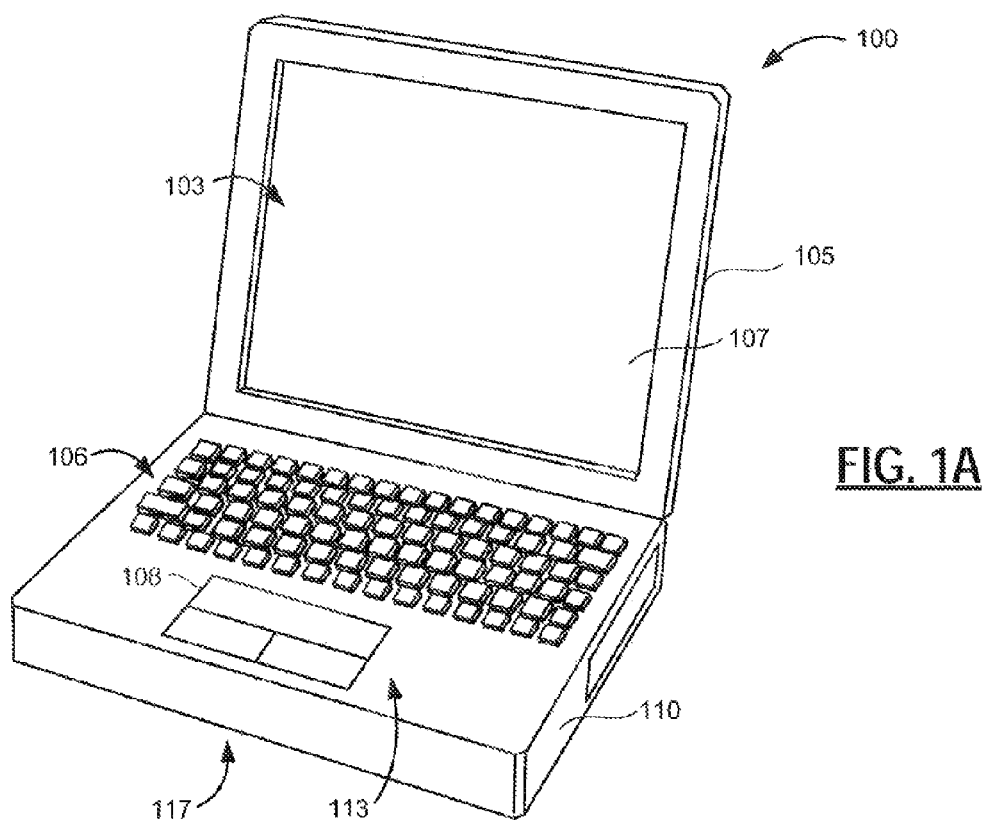
FIGS. 1A and 1B are three-dimensional perspective views of a portable electronic device according to an embodiment of the present invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . .". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional pivot mechanisms for portable electronic devices having clam-shell housing arrangements include at least one hinge element positioned at a connecting area of the display panel and base housing. For example, the hinge element may include a hollow cylinder affixed to a common end of a top surface of the base housing, while the display housing includes a shaft affixed to the common end thereof and configured to be placed within the hollow cylinder of the of the base housing. Accordingly, the two housings may be pivot about fixed axis of rotation (i.e. common end or insertion point of the shaft within hollow cylinder). However, such a configuration requires large gaps or cuts in adjacent surfaces in order to allow for clearance of the moving parts (i.e. hinge assembly) as the display panel housing is opened and closed.

Embodiments of the present invention disclose a track guided hinge assembly for a portable computer having a clam-shell housing arrangement. According to one embodiment, the track guided hinge assembly includes two mounting brackets positioned within a lower area of the base housing. Furthermore, both mounting brackets include an inner guide track having members positioned therein that are configured to follow their respective guide track simultaneously as the display panel is rotated. As such, the clam-shell housing arrangement of the portable computer can have a flush design with an ultra-slim profile.

Figure 1B:
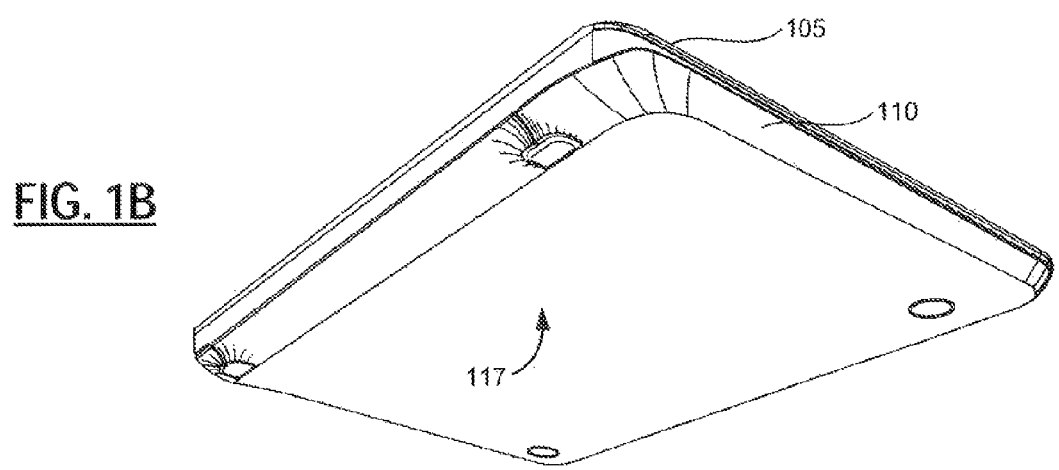

Referring now in more detail to the drawings in which like numerals identify corresponding parts throughout the views, FIGS. 1A and 1B are three-dimensional perspective views of a portable electronic device according to an embodiment of the present invention. Portable computer 100 represents the portable electronic device and includes an upper housing 105 and a base housing 110. The upper housing, or display panel housing 102, includes electrical wiring adapted to provide a display 107 to a user on its front surface side 103. As shown in FIG. 1A, the base housing 110 includes a top surface 113 and bottom surface 117 that is opposite the top surface 113. According to one embodiment, the top surface 113 of the base housing 110 may include an input means for operation by user such as a keyboard 106 and touch pad 108. FIG. 1B is a perspective view of a bottom surface 117 of the base housing 110 according to an embodiment of the present invention. As shown here, the base housing 110 and display panel 105 are in a closed position in which the display panel housing 105 is substantially aligned with display housing 110. In particular, the front surface side 103 of the display panel housing covers the front surface side (side opposite bottom surface 117) of the base housing including the keyboard 106 and touchpad 108.

Figure 2A:
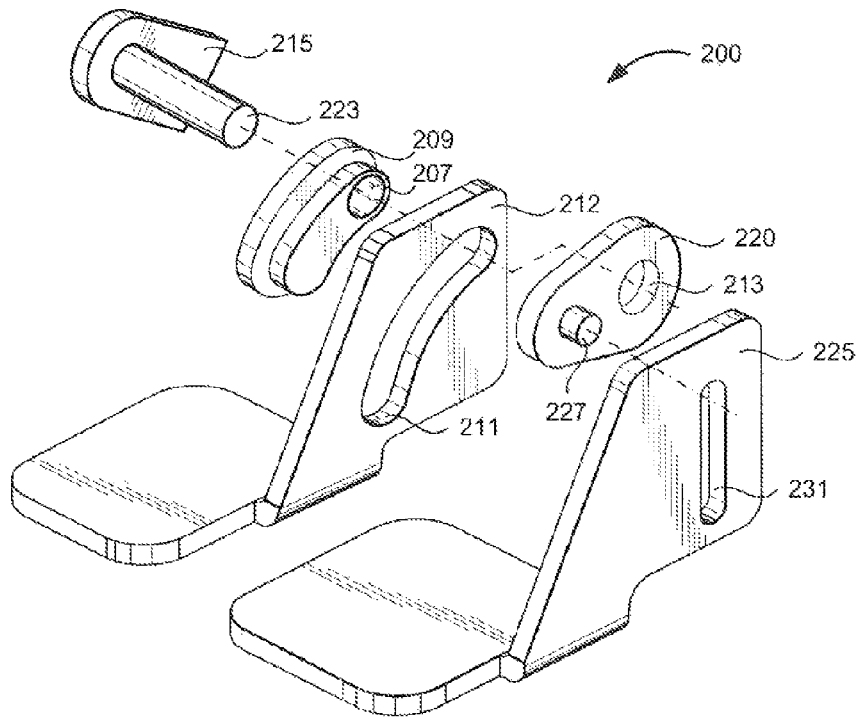
Figure 2B:
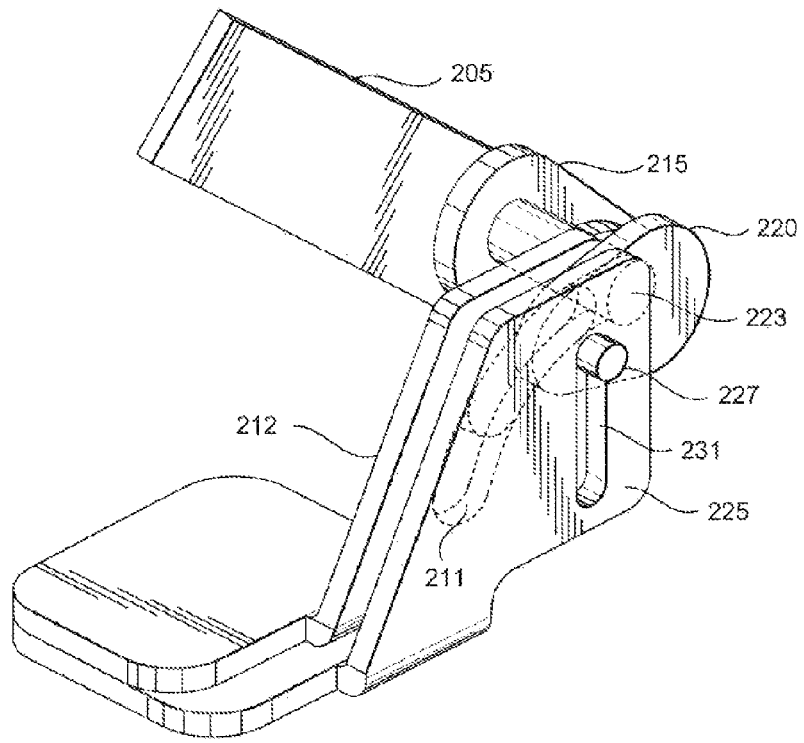
FIG. 2B is a three-dimensional assembled view of the track guided hinge assembly according to an embodiment of the present invention.

FIG. 2A is a three-dimensional exploded view of the track guided hinge assembly, while FIG. 2B is a three-dimensional assembled view of the track guided hinge according to an embodiment of the present invention. As shown in exemplary embodiment of FIG. 2A, the hinge pivot assembly 200 includes a panel bracket member 215, a rotation guide carrier 209, a first mounting bracket 225, a second mount bracket 212, and a guide plate 220. In accordance with one embodiment, the panel bracket member 215 includes a hinge pivot shaft 223 extending perpendicularly therefrom, while the rotation carrier plate 209 includes plate member 210a, guide portion 210b, and carrier aperture 207 for receiving the pivot shaft 223. However, the rotation guide carrier plate 209 may be comprised of several parts in order to form the telescoping feature afforded by protruding portion 210b. When positioned within guide track 211 of the second mount bracket 212, the telescoping feature of the carrier plate 209 allows the plate member 210a to extend further than the guide tract 211 that it is following. Furthermore, the guide plate 220 includes an offset guide pin 227 configured to follow a first guide track 231 of the first mount bracket 225, and a guide aperture 214 for receiving the pivot shaft 223.

Furthermore, and as shown in the assembled embodiment of FIG. 2B, the hinge pivot shaft 223 is inserted and passes through, in order, aperture 207 of the rotation carrier plate 209, second guide track 211 of second mount bracket 212, and guide aperture 213 of guide plate 220. Accordingly, the rotation carrier plate 209 is placed in a fixed position between the second mount bracket 212 and the panel bracket member 215, while the guide plate 220 is thereby placed in a fixed position between the first mount bracket 225 and the second mount bracket 212. According to one embodiment, the hinge pivot shaft 223 is formed in a "D" shaped profile so as to prevent attached parts (e.g. guide carrier plate 209, guide plate 220, etc.) from rotating, while also permitting a stacking style of assembly. The curved profile of the protruding portion 210b of carrier plate 209 is configured to follow the curved guide track 211 of the second mount bracket 212, thus also pulling the inserted pivot shaft 223 along guide track 211 via aperture 207. In addition, the guide pin 227 of guide plate 220 is configured to follow the first guide track 231, which is part of the first mount bracket 225. Accordingly, when the display panel 205 is opened, the rotation guide carrier plate 209 and hinge pivot shaft 223 are configured to follow the curved track profile of the second guide track 211 while simultaneously rotating guide plate 220 and causing the offset guide pin 227 to slide along the first guide track 231 of the first mount bracket 225. A more detailed explanation of pivot shaft and guide pin movement will be depicted and described with reference to FIGS. 4A and 4B.

Figure 3A:
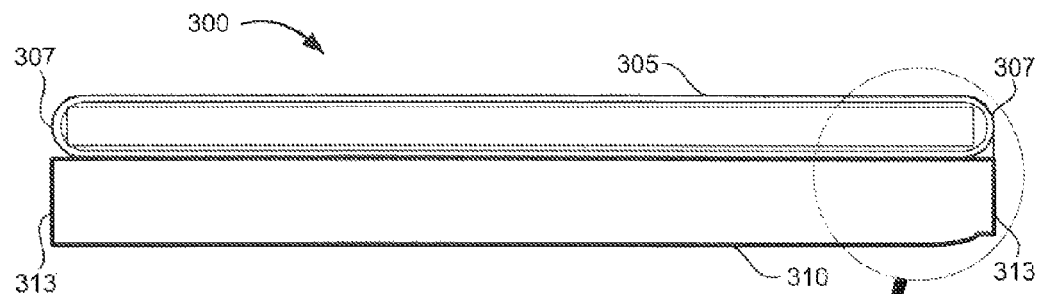
Figure 3B:
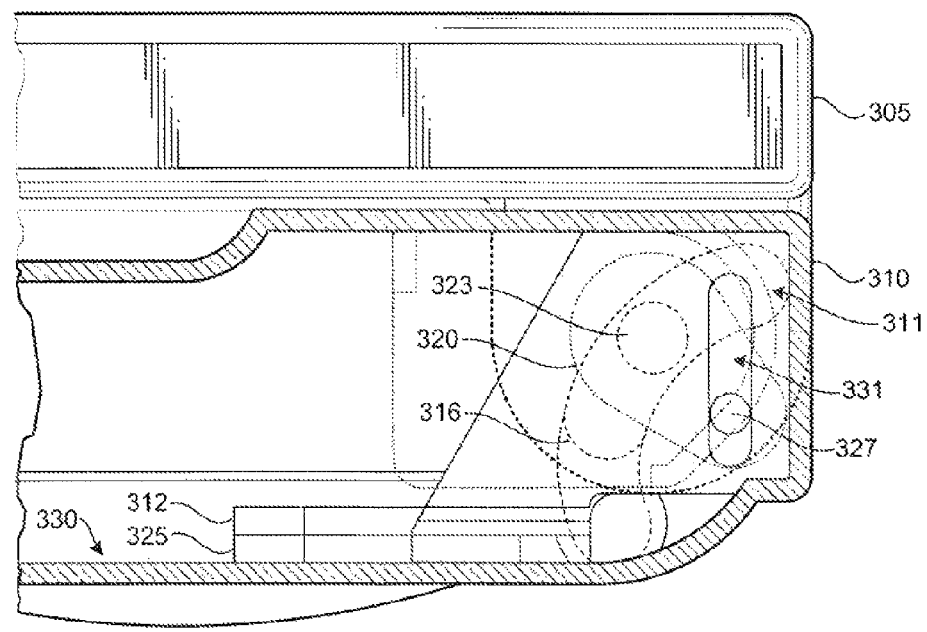
FIG. 3B is an enlarged cross-sectional view of the track guided hinge assembly according to an embodiment of the present invention.

FIG. 3A is an exemplary view of a portable electronic device and panel housing in a closed position, while FIG. 3B is an enlarged cross-sectional view of the track guided hinge assembly according to an embodiment of the present invention. As shown in FIG. 3A, the display panel housing 305 and base housing 310 of the portable computer 300 appear vertically-stacked when in a closed position. More particularly, a front end side 308 and a back end side 309 of the display panel housing 305 is substantially aligned with a front end side 313 and back end side 315 of the base housing 310. Referring now to FIG. 3B, a first mount bracket 325 is mounted on a bottom inner surface 330 of the base housing 310. According to one embodiment, the second mount bracket 312 is aligned and mounted on top of the first mount bracket 325. However, the brackets need not be aligned, but only adjacent with one another. The stacking of the first and second mount brackets allows movement of the hinge pivot shaft 223 to affect movement of the guide plate 320 and guide pin 327. Since the hinge pivot shaft 323 is coupled to the guide plate 320 (via the guide aperture) and positioned within a guide track 311 (via the rotating carrier plate), movement of the carrier plate and hinge pivot shaft 323 along the curved guide track 311 will in turn cause movement of the guide plate 320 and the offset guide pin 327 along guide track 331. That is, when the display panel housing 305 is opened and rotated so that its front end 307 moves away from front end 313 of the base housing, the hinge pivot shaft 323 follows the curved track profile due to the adjoining location of the offset guide pin 327 that is simultaneously moved along the first guide track 331 of the first mount bracket.

Figure 4A:
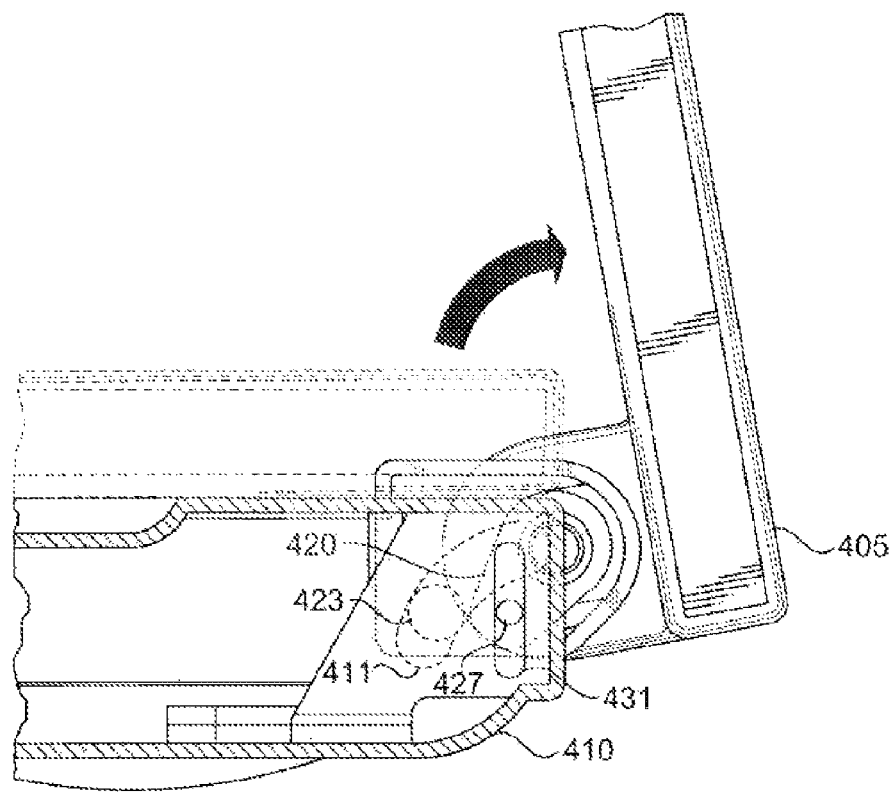
FIGS. 4A and 4B are cross-sectional views of the tracking guided hinge assembly and panel housing pivoting from a closed position to an open position according to an embodiment of the present invention.
Figure 4B:
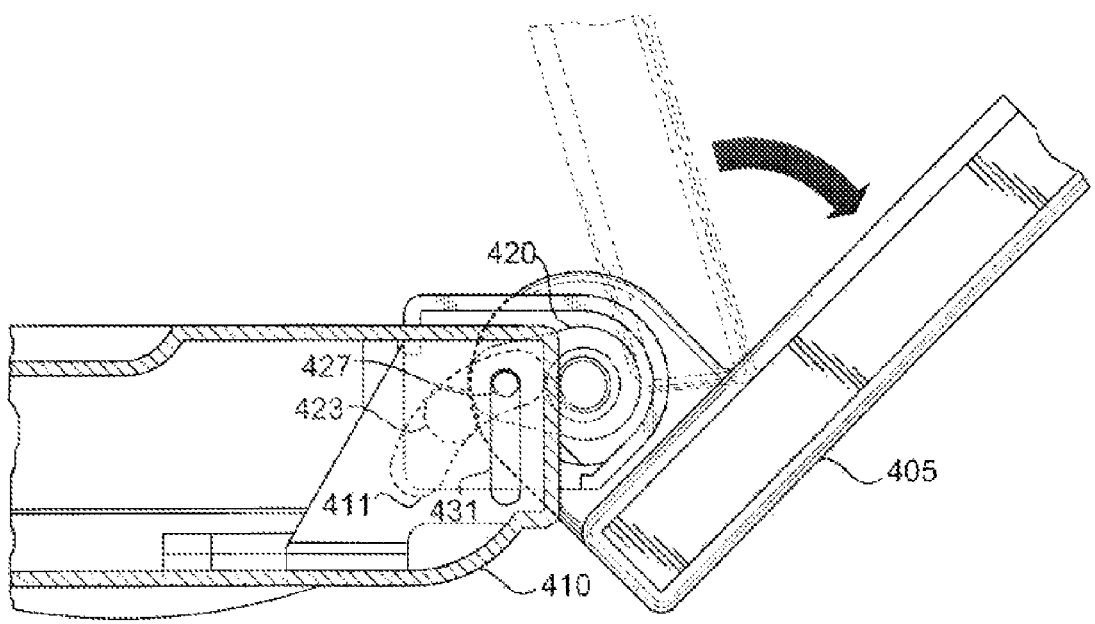

FIGS. 4A and 4B are cross-sectional views of the tracking guided hinge assembly and panel housing pivoting to an open position according to an embodiment of the present invention. As shown in the exemplary embodiment of FIG. 4A, the display panel or upper housing 405 pivots and rotates from a closed position (indicate by dotted lines) to a near perpendicular, or open position with respect to the base housing 410. Furthermore, and according to one embodiment, the hinge pivot shaft 423 moves upward along guide track 411 of the second mount bracket, which in turn causes the guide plate 420 to rotate clockwise and the offset guide pin 427 to move upward along guide track 431. Accordingly, the panel housing 405 is configured to rotate and pivot upon simultaneous movement of the hinge pivot shaft 423 within the guide track 411 and the offset guide pin 27 within guide track 431. Still further, the configuration of the present embodiment allows the panel housing 405 to pivot and rotate greater than 90° with respect to the base housing as shown in FIG. 4B.

Figure 5A:
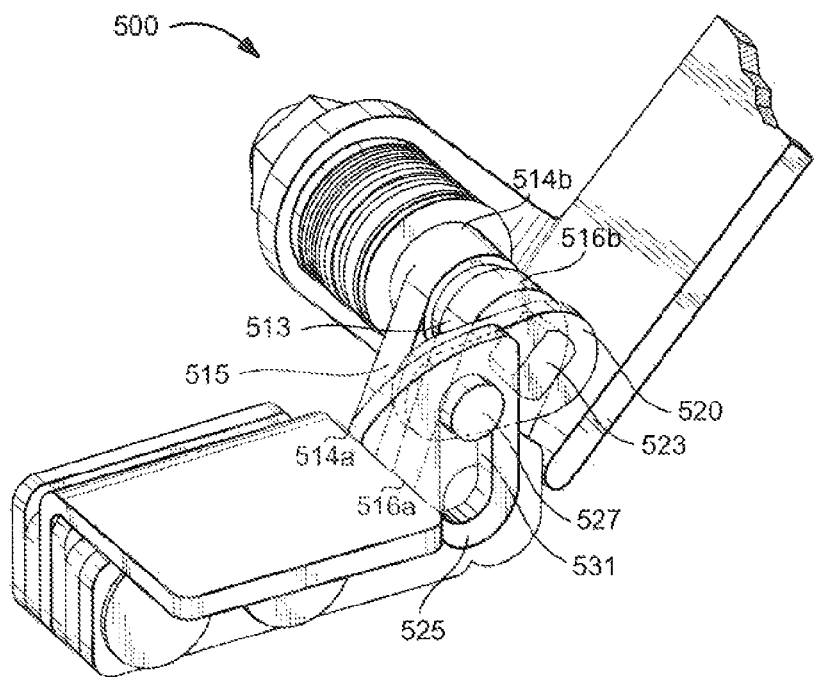
Figure 5B:
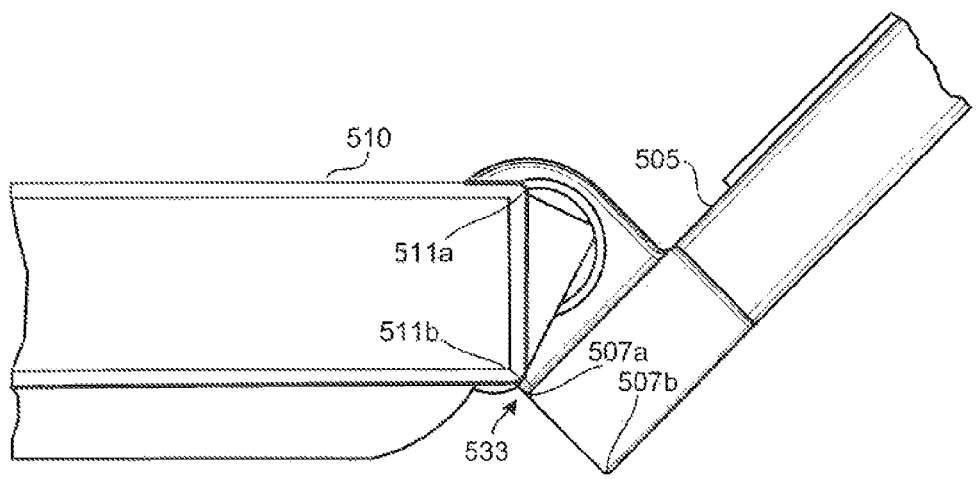
FIG. 5B is a simplified view of a portable electronic device utilizing a link arm and track guided hinge assembly according to an embodiment of the present invention.

FIG. 5A is a three-dimensional perspective view of a track guided hinge assembly utilizing a pair of link arms, while FIG. 5B is a simplified view of a portable electronic device utilizing a link arm and track guided hinge assembly 500 according to an embodiment of the present invention. According to this alternate embodiment, a pair of extended and adjacent link arms 513 and 515 are utilized in place of the second guide track and second mount bracket of the previous embodiment. In particular, each link arm 513 and 515 have a pivot point that is fixed at a respective bottom portion or area 514a and 516a, while respective upper portions or areas 514b and 516b of each link arm 513 and 515 are configured to rotate and follow the same arc and movement as the curved guide track of the previous embodiment (i.e. guide track 411 of FIG. 4A). Furthermore, and as shown in FIG. 5A, the track guided assembly 500 of the present embodiment includes a guide plate 520 having a guide pin 527. A first mounting bracket 525 includes a guide track 531 for receiving the guide pin 527. Moreover, a hinge pivot shaft 523 extends from the link arm 513 through link arm 515 and guide plate 520. Pivot and rotation of the panel 505 causes the upper areas 514b and 516b of link arms 513 and 515 to rotate along with the hinge pivot shaft 523, which in turn causes simultaneous rotation of the guide plate 520 and movement of guide pin 527 along the guide track 531. As shown in FIG. 5B, the track guided hinge assembly of the present embodiment allows the rear edges 507a-507b and 511a-511b of the panel housing 505 and base housing 510 respectively to be formed in a near square shape, while also eliminating the gap or "scoop" area 533 between lower edges 507a and 511b of the panel and base housing when in an maximum open position (i.e. panel is rotated to a maximum).

Embodiments of the present invention provide a track guided hinge assembly for a portable electronic device that includes multiple mounting brackets and simultaneous movement of multiple members configured to follow guide tracks of each mount bracket. Moreover, several advantages are afforded by the configuration of the present embodiments.

For example, the track guided hinge assembly of the present embodiments allows the display panel and base housing to be mounted flush against each other without the need for large clearance cuts in either the display panel or base housing for enabling hinge swing as in conventional methods. Furthermore, the display panel may sit lower and further away from the base housing when in an open position so as to create a lower appearance and allow for an additional open area at the back of the system for cooling internal electrical components.

Furthermore, while the invention has been described with respect to exemplary embodiments, one skilled in the art will recognize that numerous modifications are possible. For example, although exemplary embodiments depict a notebook computer as the portable electronic device, the invention is not limited thereto. For example, the portable electronic device may be a netbook, a tablet personal computer, a cell phone, or any other electronic device having a clam shell housing arrangement.

Furthermore, the first and second mount brackets may be formed on the upper surface or any surface within the base housing for facilitating movement of the hinge pivot shaft and guide pin as described in the embodiments discussed above. Similarly, the first mount bracket may be formed above or stacked on the second mount bracket as opposed to the second mount bracket positioned above the first mount bracket as described in the embodiments discussed above. Thus, although the invention has been described with respect to exemplary embodiments, it will be appreciated that the invention is intended to cover all modifications and equivalents within the scope of the following claims.

What is claimed is:

1. A portable electronic device comprising:
    a base housing including a top surface and a bottom surface opposite the top surface;
    a panel configured to cover a top surface of the base housing when in a closed position;
    a first mounting bracket mounted within the base housing and including a first guide track;
    a second mounting bracket positioned adjacent to the first bracket and including a second guide track;
    a panel bracket member including a hinge pivot shaft extending perpendicularly therefrom and configured to follow the second guide track; and
    a guide plate having a guide pin extending perpendicularly therefrom and configured to follow the first guide track;
    wherein when the panel pivots and rotates away from the base housing, the guide pin moves along the first guide track simultaneously as the pivot shaft moves along the second guide track.

2. The portable electronic device of claim 1, further comprising:
    a rotation carrier plate having an aperture for receiving the hinge pivot shaft, and a curved portion that follows the second guide track of the second track bracket.

3. The portable electronic device of claim 2, wherein the guide plate includes an aperture for receiving the hinge pivot shaft.

4. The portable electronic device of claim 1, wherein the guide plate is positioned between the first mounting bracket and the second mounting bracket.

5. The portable electronic device of claim 4, wherein the rotation carrier plate is positioned between second mounting bracket and the panel bracket member.

6. The portable electronic device of claim 1, wherein the panel moves into an open position as the guide pin moves upward within the first guide track simultaneously with the rotation carrier plate and pivot shaft moving upward within the second guide track.

7. The portable electronic device of claim 6, wherein the panel is configured to pivot to an open position when the hinge pivot shaft is positioned in a lower area of the first guide track of the first mount bracket and the guide pin is positioned in a central area of the second guide track of the second mount bracket.

8. The portable electronic device of claim 7, wherein the panel is configured to pivot and rotate at least 90° with respect to the base housing.

9. A hinge assembly for a portable computer, the assembly comprising:
    a first mounting bracket including a first guide track;
    a second mounting bracket positioned adjacent to the first bracket and including a second guide track;
    a panel bracket member including a hinge pivot shaft extending perpendicularly therefrom and configured to follow the second guide track; and
    a connecting plate having a guide pin extending perpendicularly therefrom and configured to follow the first guide track;
    wherein the guide pin moves along the first guide track simultaneously as the pivot shaft moves along the second guide track.

10. The hinge assembly of claim 9, further comprising:
    a rotation guide carrier having an aperture that surrounds the hinge pivot shaft, and a curved portion that follows the second guide track of the second track bracket.

11. The portable computer of claim 10, wherein the guide plate includes an aperture for receiving the hinge pivot shaft.

12. The hinge assembly of claim 9, wherein the connecting plate is positioned between the first mounting bracket and the second mounting bracket.

13. The hinge assembly of claim 9, wherein the rotation guide carrier is positioned between second mounting bracket and the panel bracket member.

14. The hinge assembly of claim 13, wherein the panel bracket member attaches to a panel housing of the portable computer and the first mounting bracket is mounted onto a bottom surface of a base housing of the portable computer.

15. The hinge assembly of claim 14, wherein the panel housing covers an upper surface opposite the bottom surface of the base housing when in a closed position, and
    wherein the panel housing pivots and rotates away from the base housing as the guide pin moves upward within the first guide track simultaneously with the rotation guide carrier and pivot shaft moving upward within the second guide track.

16. The hinge assembly of claim 15, wherein the panel is configured to pivot to an open position when the hinge pivot shaft is positioned in a lower area of the first guide track of the first mount bracket and the guide pin is positioned in a central area of the second guide track of the second mount bracket.

17. The hinge assembly of claim 15, wherein the panel housing if configured to pivot and rotate at least 90° with respect to the base housing.

* * * * *

UNITED STATES PATENT AND TRADEMARK OFFICE
CERTIFICATE OF CORRECTION

| | | |
|---|---|---|
| PATENT NO. | : 8,300,394 B2 | Page 1 of 1 |
| APPLICATION NO. | : 12/815568 | |
| DATED | : October 30, 2012 | |
| INVENTOR(S) | : Mark Senatori | |

It is certified that error appears in the above-identified patent and that said Letters Patent is hereby corrected as shown below:

In column 6, line 34, in Claim 11, delete "portable computer" and insert -- hinge assembly --, therefor.

Signed and Sealed this
Nineteenth Day of February, 2013

Teresa Stanek Rea
*Acting Director of the United States Patent and Trademark Office*